(12) United States Patent
Ono et al.

(10) Patent No.: US 8,452,915 B2
(45) Date of Patent: *May 28, 2013

(54) MEMORY CONTROLLER, NONVOLATILE MEMORY DEVICE, ACCESS DEVICE, AND NONVOLATILE MEMORY SYSTEM

(75) Inventors: Tadashi Ono, Osaka (JP); Tatsuya Adachi, Osaka (JP); Masahiro Nakanishi, Kyoto (JP); Takuji Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/340,016

(22) Filed: Dec. 29, 2011

(65) Prior Publication Data

US 2012/0102264 A1    Apr. 26, 2012

Related U.S. Application Data

(63) Continuation of application No. 12/376,648, filed as application No. PCT/JP2007/065424 on Aug. 7, 2007, now Pat. No. 8,166,231.

(30) Foreign Application Priority Data

Aug. 8, 2006    (JP) .................................. 2006-215940

(51) Int. Cl.
G06F 12/00    (2006.01)
(52) U.S. Cl.
USPC .................................. 711/103; 711/E12.008
(58) Field of Classification Search
USPC .......................................... 711/103, E12.008
See application file for complete search history.

(56) References Cited

U.S. PATENT DOCUMENTS

| | | | |
|---|---|---|---|
| 5,559,956 | A | 9/1996 | Sukegawa |
| 5,673,383 | A | 9/1997 | Sukegawa |
| 6,611,907 | B1 | 8/2003 | Maeda et al. |
| 2002/0106185 | A1 | 8/2002 | Fujii et al. |
| 2004/0143716 | A1 | 7/2004 | Hong |
| 2006/0120234 | A1 | 6/2006 | Aono et al. |
| 2006/0129749 | A1 | 6/2006 | Nakanishi et al. |
| 2007/0011395 | A1 | 1/2007 | Kim |
| 2008/0049504 | A1 | 2/2008 | Kasahara et al. |
| 2010/0199060 | A1 | 8/2010 | Nakanishi et al. |

FOREIGN PATENT DOCUMENTS

| | | |
|---|---|---|
| JP | 5-282880 | 10/1993 |
| JP | 2001-188701 | 7/2001 |
| JP | 2002-125185 | 4/2002 |
| JP | 2003-263894 | 9/2003 |
| JP | 2004-273037 | 9/2004 |
| JP | 2005-175783 | 6/2005 |
| WO | 2005/015406 | 2/2005 |

OTHER PUBLICATIONS

Japan Office action, mail date is Mar. 27, 2012.

*Primary Examiner* — Hoai V Ho
*Assistant Examiner* — Tri Hoang
(74) *Attorney, Agent, or Firm* — Greenblum & Bernstein, P.L.C.

(57) ABSTRACT

Without corresponding to different address spaces between an access device and a nonvolatile memory device, the access device designates a file ID to manage a data storing state only in a physical address space in the nonvolatile memory device. The access device sends the nonvolatile memory device a transfer rate through a transfer rate transmitting unit. A filling-up rate calculating unit calculates a filling-up rate of a physical block corresponding to an assurance speed required by the access device. A remaining amount corresponding to the transfer rate is sought by using the calculated filling-up rate and is transmitted to a remaining amount receiving unit of the access device.

4 Claims, 18 Drawing Sheets

F I G. 2
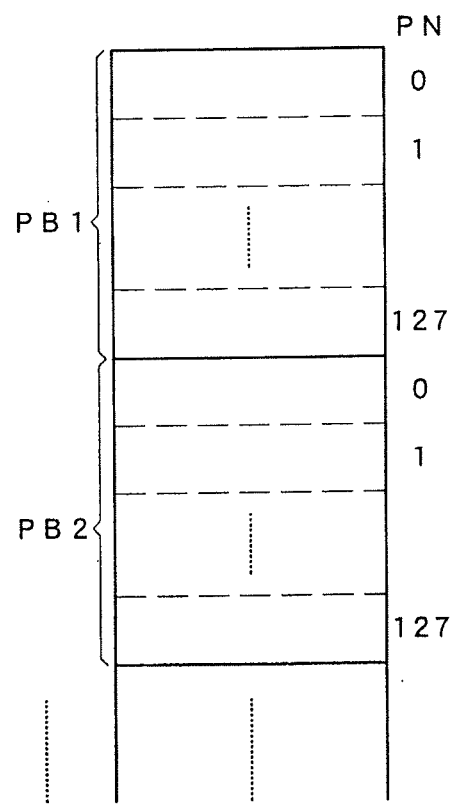

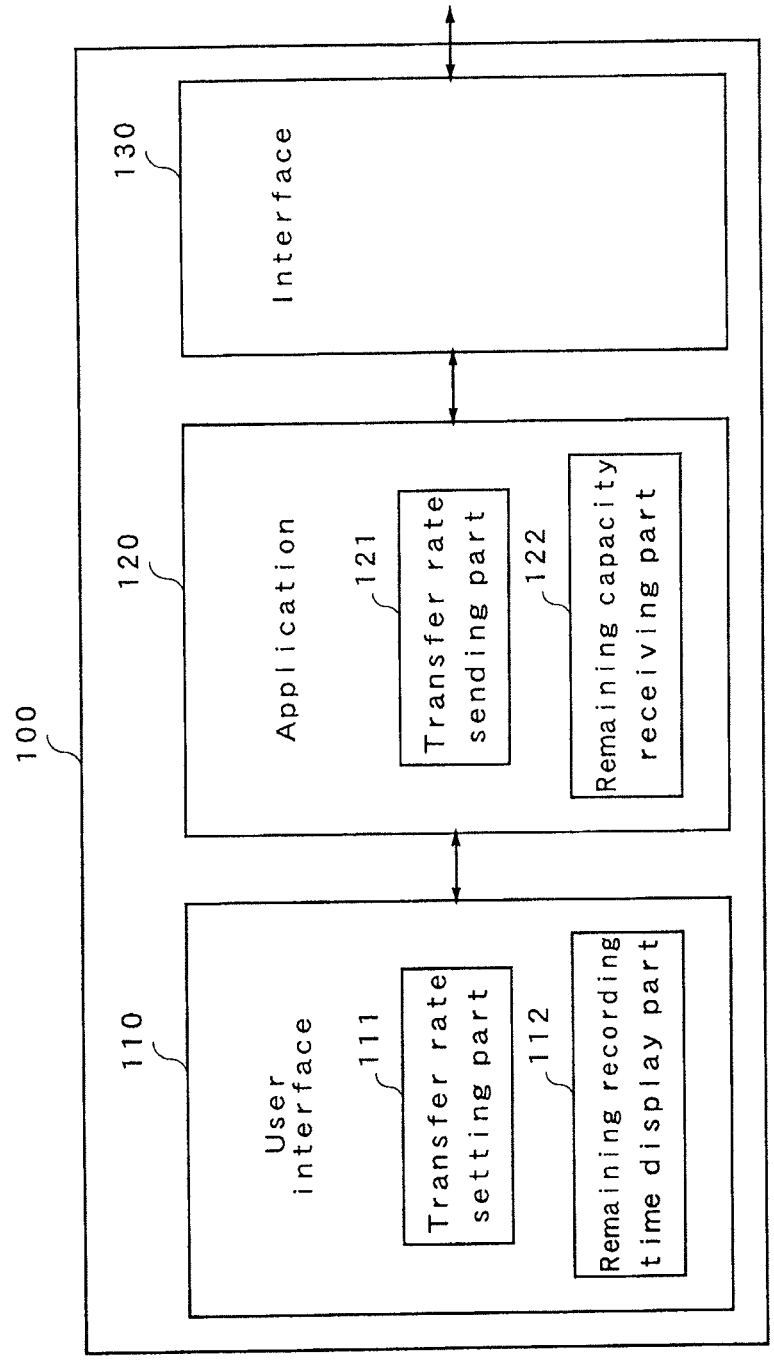

FIG. 10

| PBN | The number of valid pages |
|---|---|
| 0 | 0 |
| 1 | 3 |
| 2 | 0 |
| 3 | 0 |
| 4 | 10 |
| 5 | 1 |
| ⋮ | ⋮ |
| 4095 | 1 |

241

F I G. 1 3

| The number of valid pages | The number of physical blocks |
|---|---|
| 0 | 1000 |
| 1 | 20 |
| 2 | 50 |
| 3 | 10 |
| 4 | 80 |
| ⋮ | ⋮ |
| 128 | 50 |

⟩ 252

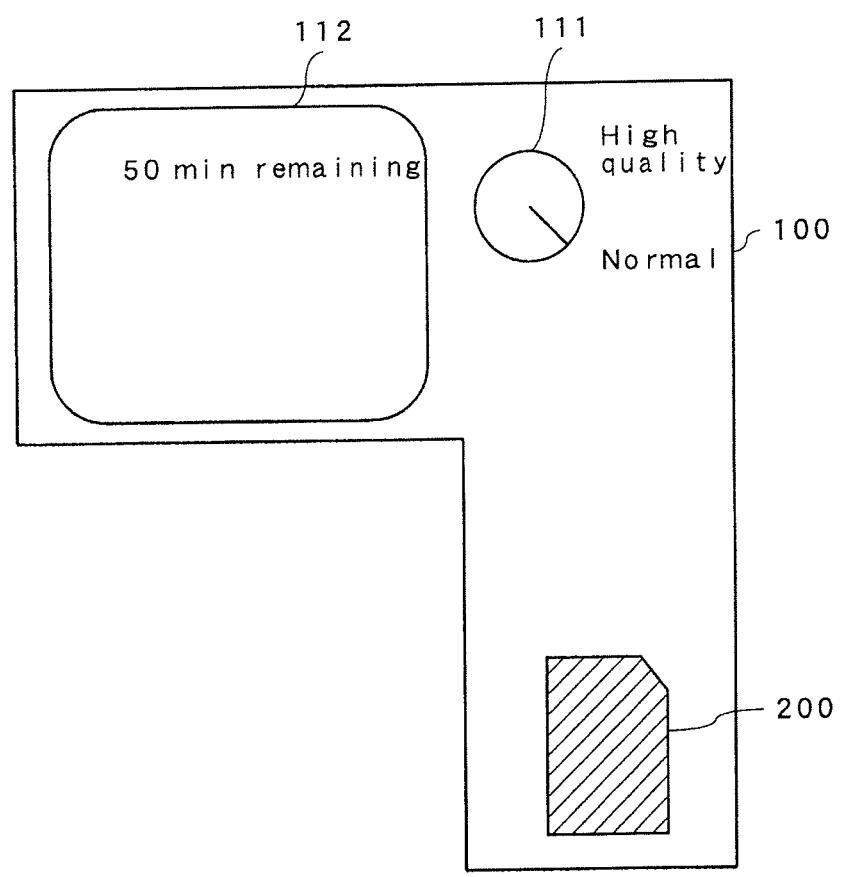
F I G. 1 4 B

F I G. 1 6 A
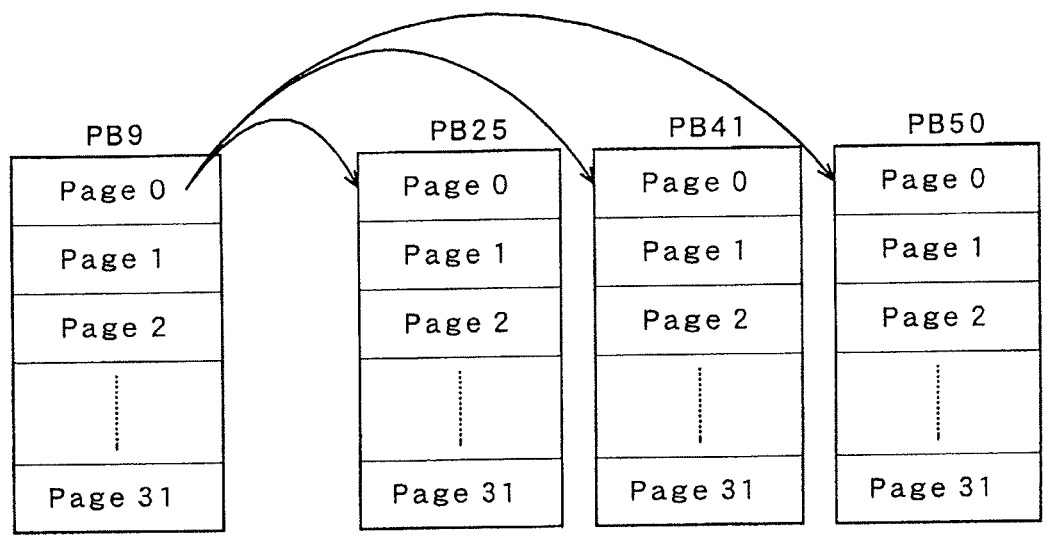
F I G. 1 6 B
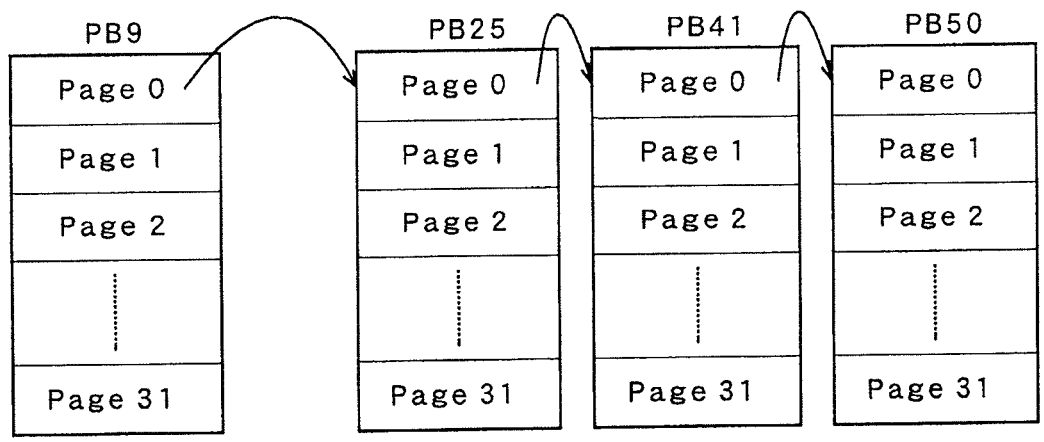

MEMORY CONTROLLER, NONVOLATILE MEMORY DEVICE, ACCESS DEVICE, AND NONVOLATILE MEMORY SYSTEM

CROSS-REFERENCE TO RELATED APPLICATIONS

This application is a continuation of U.S. Pat. No. 8,166,231, filed Feb. 6, 2009, the disclosure of which is expressly incorporated herein it its entirety.

TECHNICAL FIELD

The present invention relates to a nonvolatile memory device such as a semiconductor memory card having a nonvolatile memory, a memory controller for controlling this device, an access device for accessing said nonvolatile memory device, and a nonvolatile memory system configured by adding the access device as a component to said nonvolatile memory device.

BACKGROUND ART

A nonvolatile memory device having a rewritable nonvolatile memory is increasingly demanded mainly for a semiconductor memory card. The semiconductor memory card is high-price compared to an optical disk, media of tape, and the like, however, the demand as a recording medium is widely increasing for a portable apparatus such as a digital still camera and a mobile phone because of merits such as small-size, lightweight, vibration resistance, and easy handling. This semiconductor memory card has a flash memory as a nonvolatile main memory and has a memory controller for controlling the memory. The memory controller controls the flash memory on the reading and writing of data in accordance with reading and writing commands from the access device such as the digital still camera and a personal computer.

The flash memory incorporated in products, for example, the semiconductor memory card and a portable audio apparatus requires relatively long time to write and read data to and from a memory cell array, a storage unit. As a countermeasure to this, the flash memory is configured so that data in a plurality of memory cells can be collectively erased and so that data can be collectively written to a plurality of memory cells. The flash memory is composed of a plurality of physical blocks, and each physical block includes a plurality of pages. Data is erased in units of the physical blocks and is written in units of the pages.

Upon attaching the aforementioned nonvolatile memory device as a removal disc to the access device such as the digital still camera, the access device side manages the memory device by using a file system, for example, the FAT file system. The FAT file system manages file data in units of clusters by using a file allocation table (hereinafter referred to as a FAT). When file data is written to the nonvolatile memory device such as the semiconductor memory card, the FAT file system allocates the file data to an empty cluster by using the FAT, and further designates the file data and a cluster number (a logical address) allocated to the file data to the nonvolatile memory device.

In addition, Patent document 1 discloses in detail a nonvolatile memory system using such FAT file system. Patent document 1 discloses two types of file systems; one is a matched boundary file system which matches a boundary of a management region with a boundary of a data region in a logical address space and the other is an unmatched boundary file system which does not match the boundaries with each other.

As a property of the semiconductor memory, a data transfer speed is largely depended on storing statuses of data in physical blocks. In this respect, Patent document 2 discloses a technique by which an access device obtains a feasible data transfer speed from a nonvolatile memory device by restricting the description to a case of the matched boundary file system.

Patent document 1: Japanese Unexamined Patent Publication No. 2001-188701
Patent document 2: International publication No. WO05/015406

DISCLOSURE OF THE INVENTION

Problems to be Solved by the Invention

Problems of an access method employed by a conventional nonvolatile memory system according to, for example, Patent document 2 will be explained. The term "access method" means a method in which an access device allocates writing-target data to a logical address space and transfers the writing-target data to a nonvolatile memory device with the allocated logical address. This access method is referred to as a logical address level access method.

A size of data the access device can write to the nonvolatile memory device generally varies by a minimal data-transfer rate which can be guaranteed by the nonvolatile memory device to the access device (hereinafter referred to as a guaranteed speed). It is difficult for the conventional nonvolatile system to detect a capacity of nonvolatile memory device based on a writing speed required by the access device, and points of the difficulties will be explained with referring to FIG. 1 to FIG. 8.

FIG. 1 is a block diagram showing a configuration of a conventional nonvolatile memory system using a FAT file system. The conventional nonvolatile memory system shown in FIG. 1 includes an access device 10 and a nonvolatile memory device 13. The access device 10 includes an application part 11 and a file system 12, and the nonvolatile memory device 13 includes a memory controller 14 and a nonvolatile memory 15. When the access device 10 writes file data to the nonvolatile memory device 13, the file system 12 transfers the file data and a logical address corresponding to the file data to the memory controller 14 of the nonvolatile memory device 13. After that, the memory controller 14 converts the transferred logical address into a physical address and writes the file data to the nonvolatile memory 15 on the basis of the obtained physical address.

FIG. 2 is a view showing a relationship between physical blocks and pages in the nonvolatile memory. For example, as shown in FIG. 2, a NAND type flash memory used for the nonvolatile memory 15 is composed of a plurality of 256-kB physical blocks, and further each of the physical blocks is composed of 2-kB pages. When writing file data to the physical block of the aforementioned NAND type flash memory, it is required to erase all data of the physical block prior to the data writing.

Referring to FIG. 3, a case of rewriting 16-kB data of 256-kB file data stored in a logical block will be explained. When the access device 10 transfers the 16-kB file data and a logical address designated to the file data to the nonvolatile memory device 13, the memory controller 14 obtains a new physical block storing invalid data. As shown in FIG. 3(a), the memory controller 14 erases the invalid data of the obtained physical block and determines this physical block as a writing-target physical block. Subsequently, as shown in FIG. 3(b), the memory controller 14 writes the 16-kB file data to the new physical block. Furthermore, as shown in FIG. 3(c), the memory controller 14 copies the remaining 240-kB file data of the logical block corresponding to the logical address designated by the access device 10 from a physical block storing the file data (old physical block) to the remaining empty pages of the new physical block. This processing intends to efficiently use a memory by aggregating plural pieces of data having sizes less than the physical block size into one physical block as much as possible.

The new 16-kB file data is written into the new physical block in this manner, however, the remaining 240-kB storage region of the new physical block only stores data copied from the old block. Accordingly, the larger a size of remaining file data copied from an old physical block is, the lower a transfer rate of file data from the access device 10 is, and thus writing time per a unit capacity of new file data will be longer. That is, this means that the larger a proportion (hereinafter referred to as a filling rate) of data not to be rewritten and erased (valid data) is with respect to a physical block size, the lower the transfer rate is.

FIG. 4 is a graph showing an example of relationship between a filling rate of one physical block and a guaranteed speed. Since the copying from an old physical block is not required in a case where data is written to a physical block of 0% filling rate, a guaranteed speed in the nonvolatile memory device 13 is 2 MB/s, a maximum speed, at the point "a" in FIG. 4. The guaranteed speed lowers as the filling rate rises. In the example of FIG. 4, as shown at the point "b", a guaranteed speed of physical block of 25% filling rate is 1 MB/s. New file data cannot be written when the filling rate further increases to be 100%, and thus the guaranteed speed is 0 MB/s as shown at the point "c". Consequently, a remaining capacity, an empty capacity in the guaranteed speed of 1 MB/s, can be obtained by detecting physical blocks whose filling rate are 25% or less and by summing up the respective empty capacities of the detected physical blocks.

However, it is difficult in the conventional nonvolatile memory system to calculate the remaining capacity based on the guaranteed speed required to the nonvolatile memory device by the access device, and the reason will be shown. FIG. 5 shows a relationship between the logical address space and the physical address space in the case where the file system 12 in the nonvolatile memory system in FIG. 1 is the unmatched boundary file system.

In FIG. 5, C1 to Cn−2 show cluster numbers CN and L1 to Ln show logical block numbers, and they constitute a logical address space LA. The logical block numbers are continuously given the logical address space from a start address in units of physical block sizes (for example, 256 kB in FIG. 5), and among them a middle of the logical address L2 to the logical address Ln store file data. A physical address space PA of the nonvolatile memory 15 has a normal region and a spare region. Physical block numbers B1 to Bn+m are continuously given the physical address space from a start address in units of physical block sizes. To simplify the description, FIG. 5 shows physical blocks having the same size as that of the cluster.

In FIG. 5, the normal region on the physical address space has the same size as that of the entire logical address space. The spare region on the physical address space is used as an alternative block when a physical block in the normal region turns into a bad block. In addition, the normal region and the spare region are not physically fixed, and their physical positions are appropriately changed by a logical-physical conversion using, for example, a logical-physical conversion table. In the figure, the normal region and the spare region are separately shown to be easily recognized. Other than the normal region and the spare region, a system region for storing, for example, security-related information is included but is abbreviated to simplify the description.

As shown by a dashed-dotted line in FIG. 5, the unmatched boundary file system does not match a start address of a data region in the logical address space with a boundary of the physical blocks constituting the physical address space. Number 16 in FIG. 5 shows the boundary. Generally, since a physical block size is an integral multiple of a cluster size, namely a management unit of the logical address space, a boundary between the clusters is not matched with a boundary between arbitrary physical blocks. A FAT file system applied to many hosts, for example, a personal computer corresponds to this system.

When the application 11 provided in the access device 10 issues a command for writing file data, the file system 12 allocates the file data to empty clusters (for example, C1 and C2) in the data region on the logical address space shown in FIG. 5. Subsequently, when writing the file data to a nonvolatile memory device 13, the file system 12 transfers, to the nonvolatile memory device 13, a logical block number (for example, L3 and L4) corresponding to clusters to which the file data is allocated and the file data allocated to the clusters. A memory controller 14 in the nonvolatile memory device 13 converts the logical block number into a physical block number in logical-physical conversion processing, obtains, for example, physical blocks B6 and B7, and writes the file data to these two physical blocks. As described above, in the access method in logical address level, the access device 10 side manages the file data allocation for each cluster, management unit on the logical address space, and the nonvolatile memory device 13 side manages mapping of the file data allocated to said cluster for each physical block, management unit on the physical address space. Both names, the "allocate" and "mapping", express the same meaning of "the allocation of file data to a management unit", however, the names are consciously separated by using the "allocate" in the logical address space and using the "mapping" in the physical address space to clarify a difference of the address spaces, logical and physical.

In the access method in logical address level, the nonvolatile memory device 13 is formatted when, for example, used first after a shipment. In this processing, the access device prepares the management region and the data region in the logical address space, further generates management information, for example, a file allocation table (FAT) for managing these regions, and writes the management information to the nonvolatile memory device 13.

FIG. 6 shows a relationship of the filling rate between the clusters and the physical blocks in the logical address space and physical address space shown in FIG. 5 via physical positions of the nonvolatile memory. The nonvolatile memory in FIG. 6 includes the management region of 464 kB from the starting position. The subsequent data region includes an empty region of 208 kB, a recorded region of 96 kB, an empty region of 416 kB, and a recorded region of 96 kB. With respect to the nonvolatile memory in this state, 48 kB-data are recorded equally in clusters C1, C2, C3, and C4 in the logical address space LA, respectively. Since the filling rates of the clusters C1 to C4 are 18.75%, it seems that the guaranteed speed, for example, of 1 MB/s can be realized. However, in the physical address space PA, physical blocks B3 and B5 store 96-kB data and physical blocks B4 and B6 do not store data. The filling rates of the physical blocks B3 and B5 are 37.5% and the filling rates of the physical blocks B4 and B6 are 0%. Accordingly, the physical blocks B4 and B6 realize the guaranteed speed of 1 MB/s, however, the physical blocks B3 and B5 cannot realize the guaranteed speed of 1 MB/s. As described above, if it is determined on the logical address space that the guaranteed speed can be realized, the guaranteed speed sometimes cannot be realized on the physical address space. Thus, the file system 12 of the access device 10 is not able to correctly obtain a remaining capacity which realizes a given guaranteed speed.

Next, a case where the file system 12 is the matched boundary file system will be explained. FIG. 7 shows a relationship between the logical address space and the physical address space in the case where the file system 12 in the nonvolatile memory system in FIG. 1 is the matched boundary file system. As shown by a boundary 16 of a dashed-dotted line in FIG. 7, the matched boundary file system matches a start address of a data region in the logical address space with a boundary of the physical blocks (a boundary between physical blocks B2 and B3 in FIG. 7) constituting the physical address space. The matched boundary file system applies to, for example, a digital still camera using the SD card, and is realized by modifying the above mentioned unmatched boundary file system so that a boundary between arbitrary physical blocks can be matched with a boundary between the clusters. Specifically, a formatting process is executed so that a management region in the logical address space can be an integral multiple of a size of the physical block (physical blocks B1 and B2 in FIG. 7).

In FIG. 8, the nonvolatile memory includes the management region of 512 kB from the starting position. The subsequent data region includes an empty region of 160 kB, a recorded region of 96 kB, an empty region of 416 kB, and a recorded region of 96 kB. With respect to the nonvolatile memory in this state, 96 kB-data are recorded equally to clusters C1 and C3 in the logical address space LA, and both of their filling rates are 37.5%. Also in the physical address space, 96 kB-data are recorded equally to physical blocks B3 and B5 corresponding to clusters C1 and C3, and both of their filling rates are 37.5%. As described above, since the filling rate of the cluster coincides with the filling rate of the physical block in the matched boundary file system, the access device 10 itself can correctly obtains a remaining capacity realizing a guaranteed speed. However, the access device 10 is required to obtain a physical block size and information to relate physical block numbers to cluster numbers from the nonvolatile memory device 13 to that end, and thus it takes long time to transfer these data. In addition, since the physical block size varies depending on a type of the nonvolatile memory device 13, a control of the file system 12 of the access device 10 is complicated.

As described above, in the logical address level access method, it is difficult to obtain a remaining capacity of the nonvolatile memory device corresponding to a transfer rate requested by the access device because the above explained problems are caused in relating a state of the physical address space to a state of the logical address space. Accordingly, in the application requiring a transfer rate of a certain value or more during operations, for example, the video shooting and the still image continuous shooting, it is impossible to write data to all physical pages in the flash memory. In other words, since the transfer rate of data to the physical block varies depending on the number of pages storing data in each physical block, the transfer rate designated by the access device is sometimes not guaranteed.

In short, in the case where the file system is the unmatched boundary file system in a conventional nonvolatile memory system, a correspondence relationship between clusters which are references for calculation of remaining capacity in an access device and physical blocks of a nonvolatile memory device affecting a transfer rate is not clear. For that reason, the access device cannot obtain a remaining capacity of the nonvolatile memory device corresponding to the requested transfer rate.

On the other hand, the problems in the unmatched boundary file system are solved in the matched boundary file system, however, it is difficult for the access device and nonvolatile memory device to install the matched boundary file system as explained above. In addition, since the number of access devices employing the matched boundary file system is limited, all of the access devices cannot necessarily obtain the remaining capacity based on the transfer rate.

In consideration of the above mentioned problems, the present invention intends to provide a memory controller, a nonvolatile memory device, an access device, and a nonvolatile memory system which obtain a remaining capacity of a nonvolatile memory realizing the real time recording at a transfer rate designated by the access device whether a file system of the access device is the unmatched boundary file system or the matched boundary file system.

Means to Solve the Problems

To solve the problems, a memory controller according to the present invention connected to a nonvolatile memory having a plurality of physical blocks composed of a plurality of pages comprises: a reading and writing control part for writing file data to said nonvolatile memory on the basis of a file ID designated from an outside; a remaining capacity sending part for receiving a transfer rate to said nonvolatile memory from the outside, detecting the number of physical blocks in which the number of valid pages storing valid data in each physical block is at most the predetermined number, detecting an empty capacity of said nonvolatile memory on the basis of said number of physical blocks, and outputting the detected empty capacity to an outside.

Said remaining capacity sending part may include: a filling rate calculation part for determining the maximum number of valid pages in a physical block realizing said transfer rate on the basis of the transfer rate received from the outside; a remaining capacity table for obtaining the number of valid pages in each physical block of said nonvolatile memory and retaining the number of physical blocks for each of the numbers of valid pages; and a remaining capacity detection part for calculating summation of empty capacities of the physical blocks having the maximum number of valid pages determined by said filling rate calculation part or less and outputting the summation to an outside.

Said remaining capacity sending part may include: a filling rate calculation part for determining the maximum number of valid pages in a physical block realizing said transfer rate on the basis of the transfer rate received from the outside; a remaining capacity table for obtaining the number of valid pages in each physical block of said nonvolatile memory and retaining the number of physical blocks for each of the numbers of valid pages; and a remaining capacity detection part for determining an empty capacity of physical block by subtracting a capacity of the maximum number of valid pages determined by said filling rate calculation part from a capacity of physical block, obtaining the total number of physical blocks having the maximum number of valid pages determined by said filling rate calculation part or less from said remaining capacity table, calculating a remaining capacity on the basis of said empty capacity of physical block and said number of physical blocks, and sending the remaining capacity to an outside.

Said reading and writing control part may include a physical region management table for retaining the number of valid pages for each physical block in said nonvolatile memory.

Said remaining capacity sending part may include: a filling rate calculation part for determining the maximum number of valid pages in a physical block realizing said transfer rate on the basis of the transfer rate received from the outside; a remaining capacity table for storing the capacity summing up the number of corresponding physical blocks for each of the numbers of valid pages by using said physical region management table; and a remaining capacity detection part for calculating summation of empty capacities of the physical blocks having the maximum number of valid pages determined by said filling rate calculation part or less and outputting the summation to an outside.

Said remaining capacity sending part may include: a filling rate calculation part for determining the maximum number of valid pages in a physical block realizing said transfer rate on the basis of the transfer rate received from the outside; a remaining capacity table for storing the capacity summing up the number of corresponding physical blocks for each of the numbers of valid pages by using said physical region management table; and a remaining capacity detection part for determining an empty capacity of physical block by subtracting a capacity of the maximum number of valid pages determined by said filling rate calculation part from a capacity of physical block, obtaining the total number of physical blocks having the maximum number of valid pages determined by said filling rate calculation part or less from said remaining capacity table, calculating a remaining capacity on the basis of said empty capacity of physical block and said number of physical blocks, and sending the remaining capacity to an outside.

In addition, a nonvolatile memory device according to the present invention comprises: a nonvolatile memory having a plurality of physical blocks composed of a plurality of pages; and a memory controller and for storing file dada on the basis of a file ID designated from an outside, wherein said memory controller includes: a reading and writing control part for writing file data to said nonvolatile memory on the basis of a file ID designated from an outside; a remaining capacity sending part for receiving a transfer rate to said nonvolatile memory from the outside, detecting the number of physical blocks in which the number of valid pages storing valid data in each physical block is at most the predetermined number, detecting an empty capacity of said nonvolatile memory on the basis of said number of physical blocks, and outputting the detected empty capacity to an output.

Said remaining capacity sending part may include: a filling rate calculation part for determining the maximum number of valid pages in a physical block realizing said transfer rate on the basis of the transfer rate received from the outside; a remaining capacity table for obtaining the number of valid pages in each physical block of said nonvolatile memory and retaining the number of physical blocks for each of the numbers of valid pages; and a remaining capacity detection part for calculating summation of empty capacities of the physical blocks having the maximum number of valid pages determined by said filling rate calculation part or less and outputting the summation to an outside.

Said remaining capacity sending part may include: a filling rate calculation part for determining the maximum number of valid pages in a physical block realizing said transfer rate on the basis of the transfer rate received from the outside; a remaining capacity table for obtaining the number of valid pages in each physical block of said nonvolatile memory and retaining the number of physical blocks for each of the numbers of valid pages; and a remaining capacity detection part for determining an empty capacity of physical block by subtracting a capacity of the maximum number of valid pages determined by said filling rate calculation part from a capacity of physical block, obtaining the total number of physical blocks having the maximum number of valid pages determined by said filling rate calculation part or less from said remaining capacity table, calculating a remaining capacity on the basis of said empty capacity of physical block and said number of physical blocks, and sending the remaining capacity to an outside.

Said reading and writing control part may include a physical region management table for retaining the number of valid pages for each physical block in said nonvolatile memory.

Said remaining capacity sending part may include: a filling rate calculation part for determining the maximum number of valid pages in a physical block realizing said transfer rate on the basis of the transfer rate received from the outside; a remaining capacity table for storing the capacity summing up the number of corresponding physical blocks for each of the numbers of valid pages by using said physical region management table; and a remaining capacity detection part for calculating summation of empty capacities of the physical blocks having the maximum number of valid pages determined by said filling rate calculation part or less and outputting the summation to an outside.

Said remaining capacity sending part may include: a filling rate calculation part for determining the maximum number of valid pages in a physical block realizing said transfer rate on the basis of the transfer rate received from the outside; a remaining capacity table for storing the capacity summing up the number of corresponding physical blocks for each of the numbers of valid pages by using said physical region management table; and a remaining capacity detection part for determining an empty capacity of physical block by subtracting a capacity of the maximum number of valid pages determined by said filling rate calculation part from a capacity of physical block, obtaining the total number of physical blocks having the maximum number of valid pages determined by said filling rate calculation part or less from said remaining capacity table, calculating a remaining capacity on the basis of said empty capacity of physical block and said number of physical blocks, and sending the remaining capacity to an outside.

In addition, a nonvolatile memory system according to the present invention comprises: an access device; and a nonvolatile memory device for storing file data on the basis of a file ID designated from said access device, wherein said access device includes: a transfer rate sending part for sending a transfer rate used for file data transfer to the nonvolatile memory device; and a remaining capacity receiving part for obtaining a remaining capacity of said nonvolatile memory device based on the sent transfer rate, and said nonvolatile memory device includes: a nonvolatile memory having a plurality of physical blocks composed of a plurality of pages; a reading and writing control part for writing file data to said nonvolatile memory on the basis of a file ID designated from said access device; a remaining capacity sending part for receiving a transfer rate to said nonvolatile memory from the outside, detecting the number of physical blocks in which the number of valid pages storing valid data in each physical block is at most the predetermined number, detecting an empty capacity of said nonvolatile memory on the basis of said number of physical blocks, and outputting the detected empty capacity to said access device.

Said remaining capacity sending part may include: a filling rate calculation part for determining the maximum number of valid pages in a physical block realizing said transfer rate on the basis of the transfer rate received from said access device; a remaining capacity table for obtaining the number of valid pages in each physical block of said nonvolatile memory and retaining the number of physical blocks for each of the numbers of valid pages; and a remaining capacity detection part for calculating summation of empty capacities of the physical blocks having the maximum number of valid pages determined by said filling rate calculation part or less and outputting the summation to said access device.

Said remaining capacity sending part may include: a filling rate calculation part for determining the maximum number of valid pages in a physical block realizing said transfer rate on the basis of the transfer rate received from said access device; a remaining capacity table for obtaining the number of valid pages in each physical block of said nonvolatile memory and retaining the number of physical blocks for each of the numbers of valid pages; and a remaining capacity detection part for determining an empty capacity of physical block by subtracting a capacity of the maximum number of valid pages determined by said filling rate calculation part from a capacity of physical block, obtaining the total number of physical blocks having the maximum number of valid pages determined by said filling rate calculation part or less from said remaining capacity table, calculating a remaining capacity on the basis of said empty capacity of physical block and said number of physical blocks, and sending the remaining capacity to said access device.

Said reading and writing control part may include a physical region management table for retaining the number of valid pages for each physical block in said nonvolatile memory.

Said remaining capacity sending part may include: a filling rate calculation part for determining the maximum number of valid pages in a physical block realizing said transfer rate on the basis of the transfer rate received from the outside; a remaining capacity table for storing the capacity summing up the number of corresponding physical blocks for each of the numbers of valid pages by using said physical region management table; and a remaining capacity detection part for calculating summation of empty capacities of the physical blocks having the maximum number of valid pages determined by said filling rate calculation part or less and outputting the summation to said access device.

Said remaining capacity sending part may include: a filling rate calculation part for determining the maximum number of valid pages in a physical block realizing said transfer rate on the basis of the transfer rate received from said access device; a remaining capacity table for storing the capacity summing up the number of corresponding physical blocks for each of the numbers of valid pages by using said physical region management table; and a remaining capacity detection part for determining an empty capacity of physical block by subtracting a capacity of the maximum number of valid pages determined by said filling rate calculation part from a capacity of physical block, obtaining the total number of physical blocks having the maximum number of valid pages determined by said filling rate calculation part or less from said remaining capacity table, calculating a remaining capacity on the basis of said empty capacity of physical block and said number of physical blocks, and sending the remaining capacity to said access device.

Said access device may include a display part for displaying information related to a remaining capacity of said nonvolatile memory.

In addition, an access device according to the present invention for writing and reading data to and from the outside by designating a file ID to an outside, comprises: a transfer rate sending part for sending a transfer rate used for file data transfer to the outside; and a remaining capacity receiving part for obtaining a remaining capacity of said outside based on the sent transfer rate.

Said access device may include a display part for displaying information related to a remaining capacity of said outside.

Effectiveness of the Invention

According to the present invention, when an access device designates a transfer rate required to a nonvolatile memory device, a remaining capacity corresponding to a transfer rate designated by an access device can be obtained on the basis of a data recording state for each block on a physical address space of a nonvolatile memory. The access device accordingly can obtain a correct remaining capacity of the nonvolatile memory device corresponding to the transfer rate requested by an application of the access device and information, for example, a remaining recording time or remaining recording number which can be calculated from the remaining capacity.

BRIEF DESCRIPTION OF DRAWINGS

FIG. 2 is a view showing one example of a relationship between physical blocks and pages in a nonvolatile memory.

FIG. 9A is a block diagram showing an access device of a nonvolatile memory system in an embodiment of the present invention.

FIG. 10 is a view showing one example of a physical region management table of the embodiment.

FIG. 13 is a view showing one example of a remaining capacity table created by a remaining capacity detection part 250 of the embodiment.

FIG. 14B is a view showing one example of the nonvolatile memory system in the embodiment of the present invention.

FIG. 16A is a view explaining a linking state of physical blocks storing file data in the embodiment.

FIG. 16B is a view explaining a linking state of physical blocks storing file data in the embodiment.

EXPLANATION FOR REFERENCE NUMERALS

Figure 1:
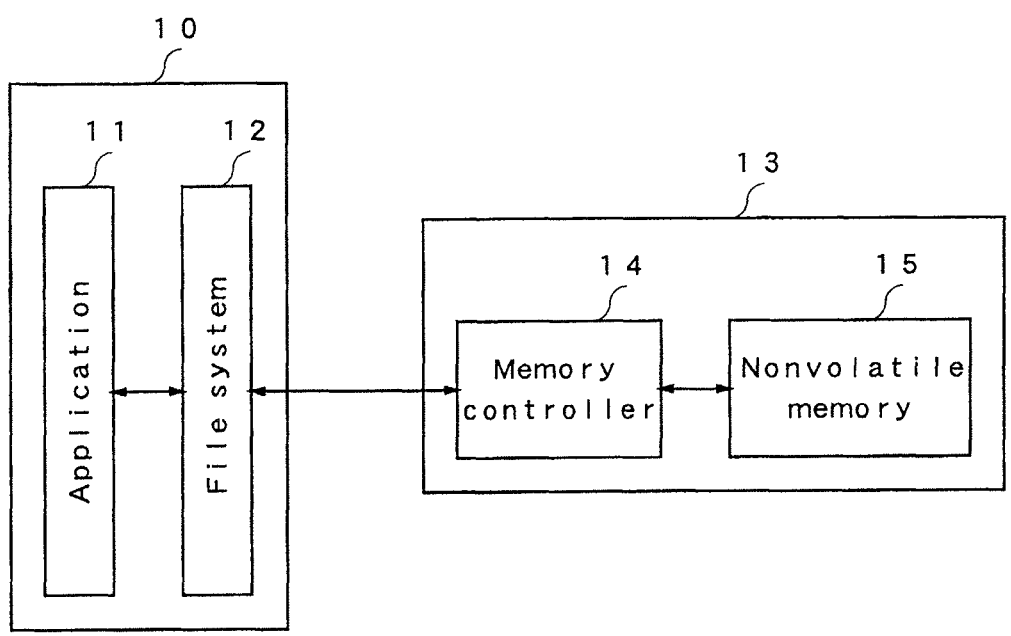
FIG. 1 is a block diagram showing a nonvolatile memory system employing a conventional FAT file system.
Figure 3:
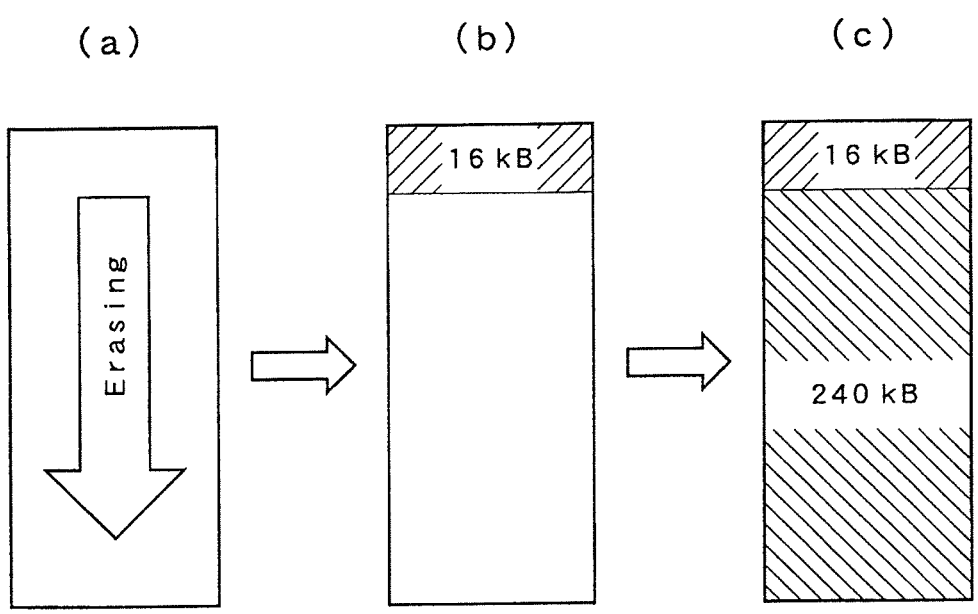
FIG. 3 is a view showing one example of data erasing and writing processes in the nonvolatile memory.
Figure 4:
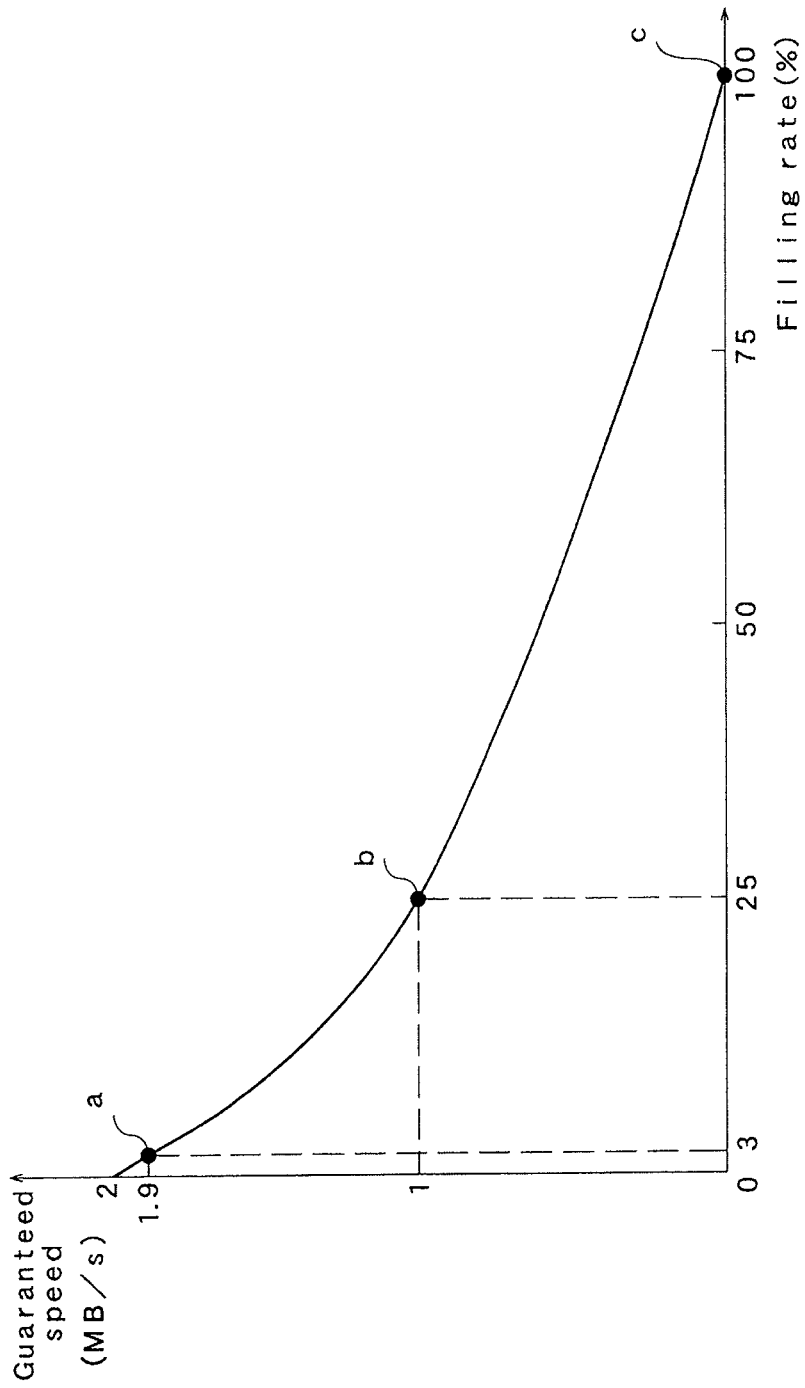
FIG. 4 is a graph showing one example of a relationship between a filling rate of physical block and a guaranteed speed.
Figure 5:
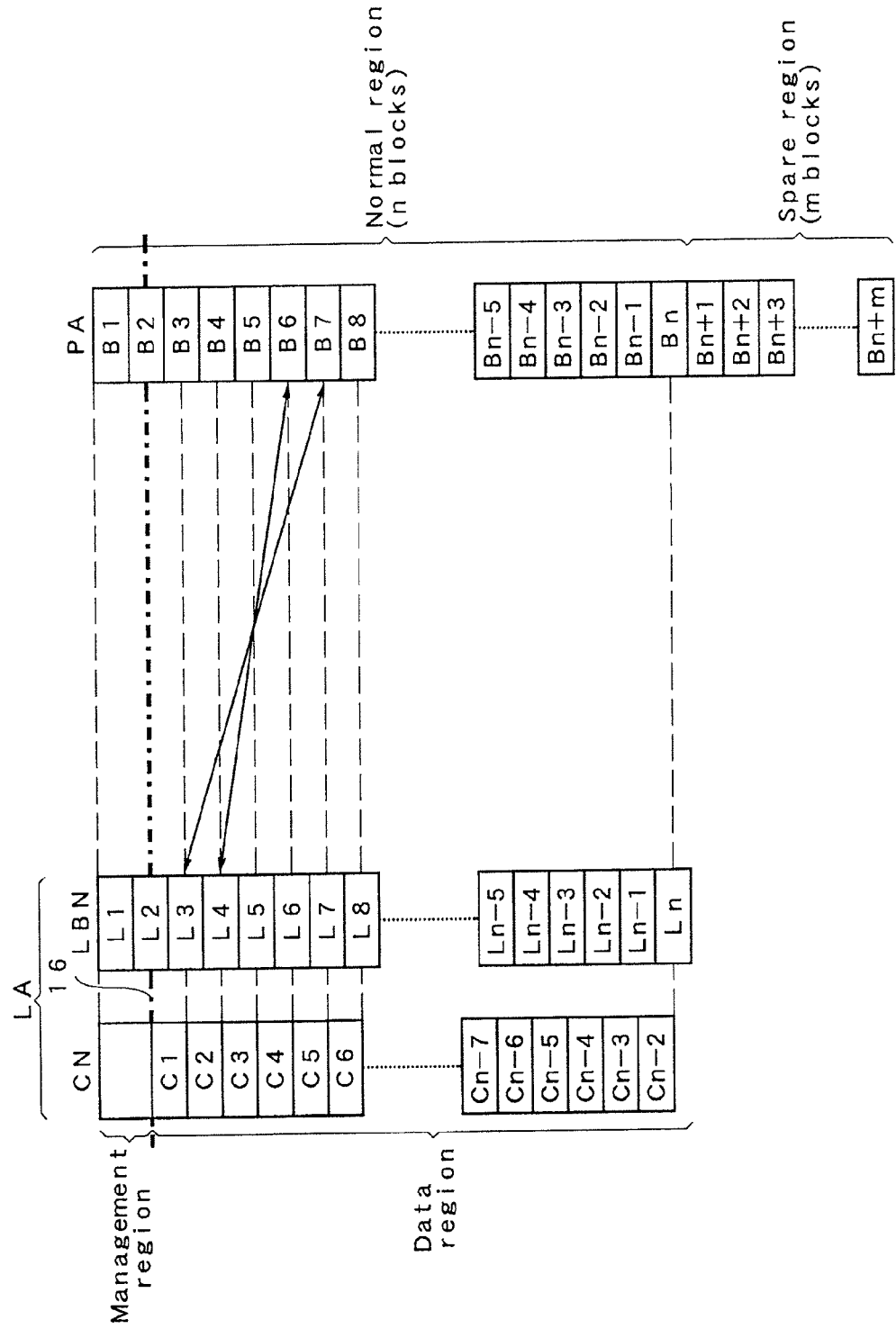
FIG. 5 is a memory map showing correspondence relationship between a logical address space and a physical address space in a nonvolatile memory system employing an unmatched boundary file system.
Figure 6:
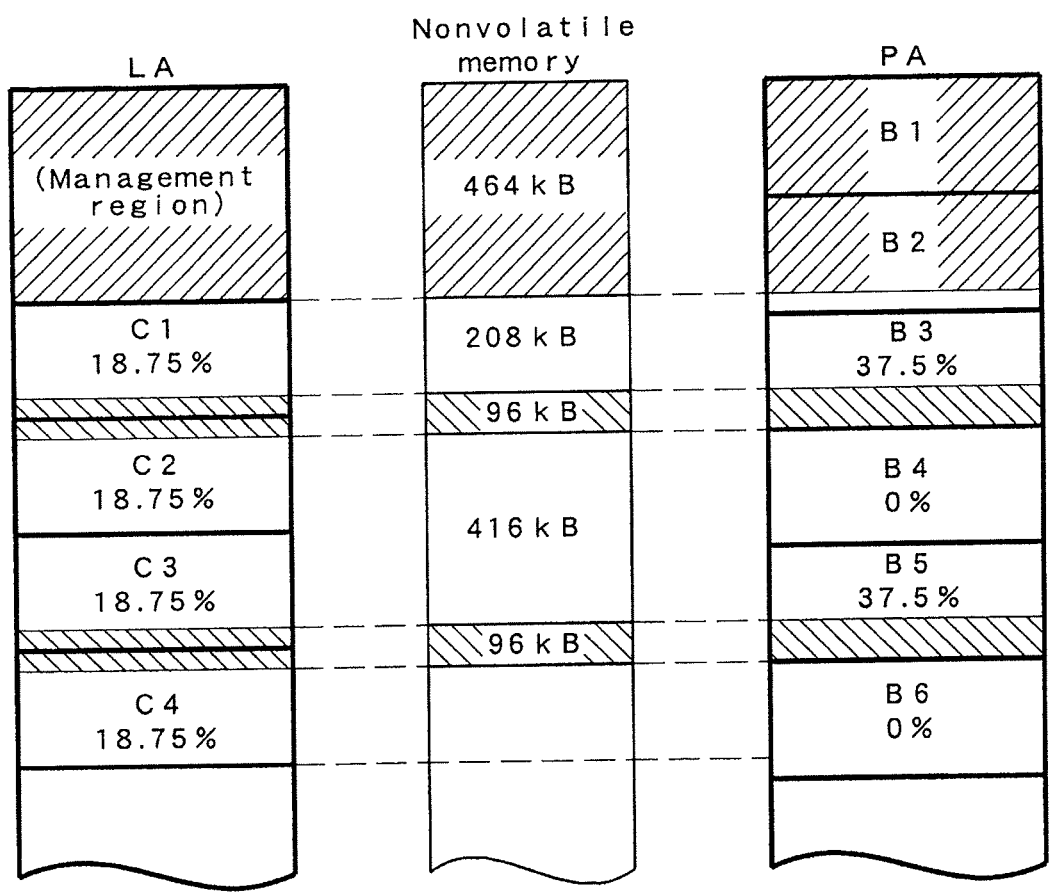
FIG. 6 is a view showing a relationship of filling rates in the logical address space and physical address space in the configuration in FIG. 5.
Figure 7:
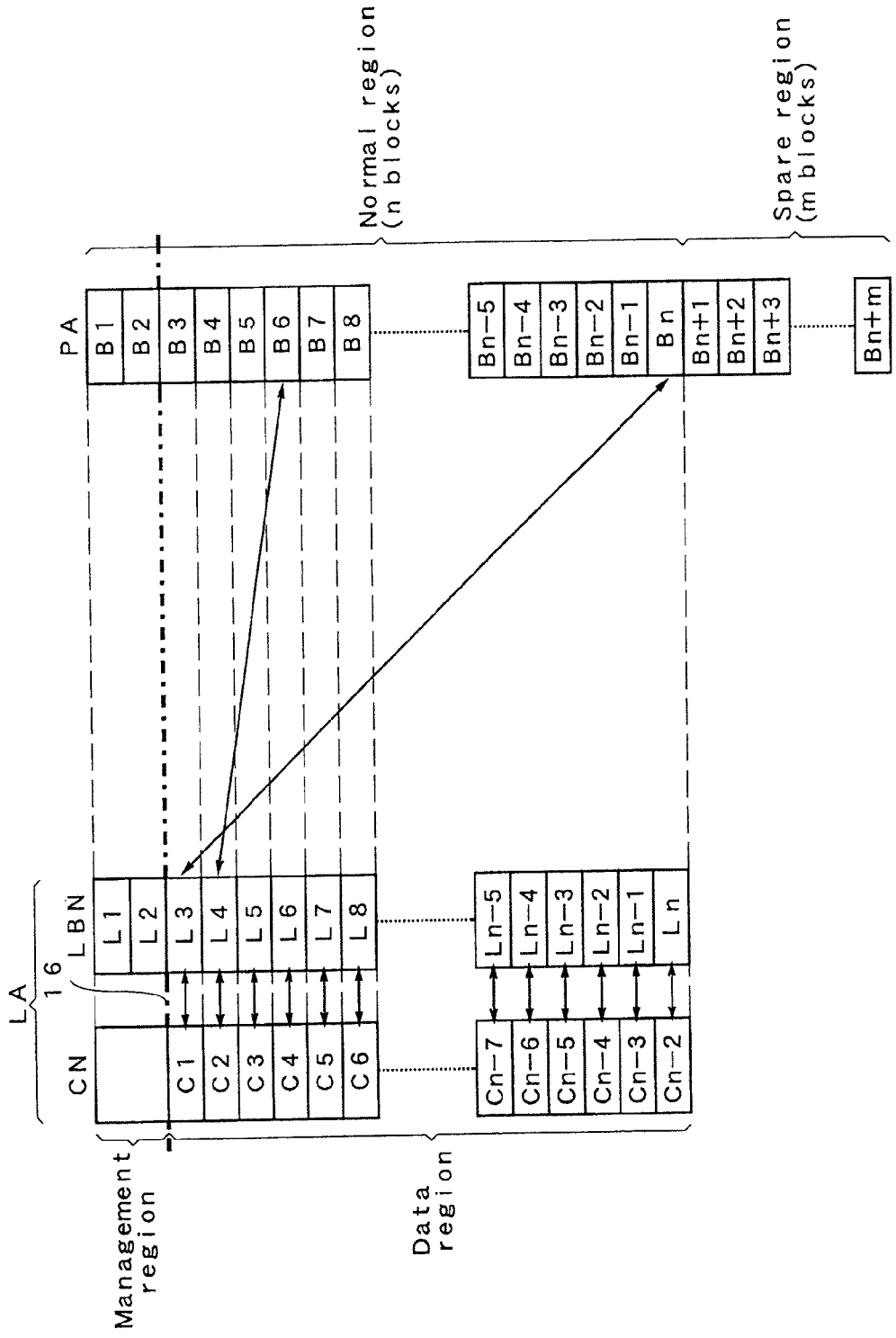
FIG. 7 is a memory map showing correspondence relationship between a logical address space and a physical address space in a nonvolatile memory system employing an matched boundary file system.
Figure 8:
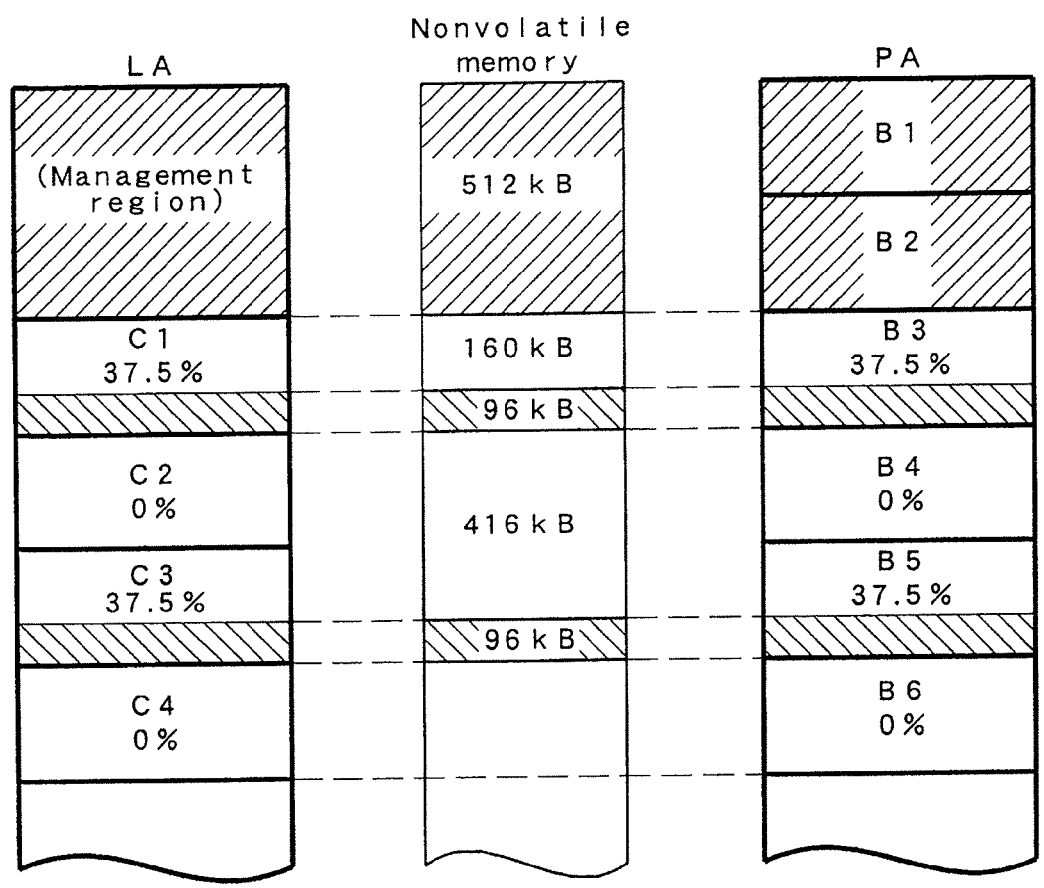
FIG. 8 is a view showing a relationship of filling rates in the logical address space and physical address space in the configuration in FIG. 7.
Figure 9B:
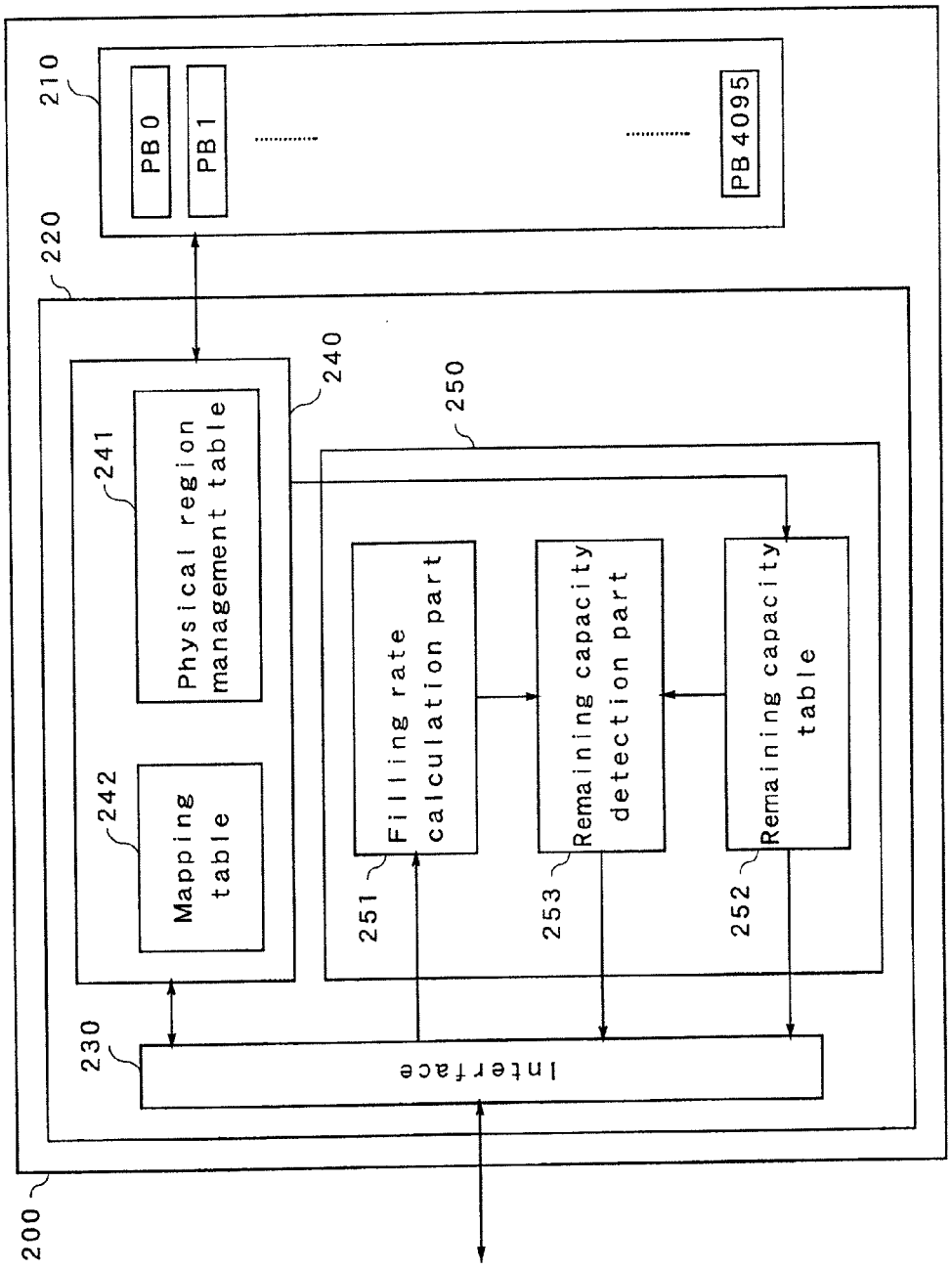
FIG. 9B is a block diagram showing a nonvolatile memory device of the nonvolatile memory system in the embodiment of the present invention.

| | |
|---|---|
| 100 | Access device |
| 110 | User interface |
| 111 | Transfer rate setting part |
| 112 | Remaining recording time display part |
| 120 | Application |
| 121 | Transfer rate sending part |
| 122 | Remaining capacity receiving part |
| 130, 230 | Interface |
| 200 | Nonvolatile memory device |
| 210 | Nonvolatile memory |
| 220 | Memory controller |
| 240 | Reading and writing controller |
| 241 | Physical region management table |
| 242 | Mapping table |
| 250 | Remaining capacity sending part |
| 251 | Filling rate calculation part |
| 252 | Remaining capacity table |
| 260 | Remaining capacity detection part |

BEST MODE FOR CARRYING OUT THE INVENTION

In the present embodiment, an access device designates a file ID and a nonvolatile memory device maps file data related to the file ID on the physical address space of a nonvolatile memory without relating different address spaces of the access device and the nonvolatile memory device with each other. The inventors found that the problems caused when a state of the physical address space is related to a state of the logical address space can be solved by this method. The method is hereinafter referred to as a file level access method.

Referring to FIG. 9 to FIG. 16B, an embodiment of a nonvolatile memory system according to the present invention will be explained. FIG. 9A is a block diagram showing an access device 100 of the nonvolatile memory system in the present embodiment, and FIG. 9B shows a non volatile memory device 200.

The nonvolatile memory system includes the access device 100 and the nonvolatile memory device 200, and the access device 100 includes a user interface 110, an application 120, and an interface 130.

The user interface 110 includes a transfer rate setting part 111 and remaining recording time display part 112. The transfer rate setting part 111 sets a transfer rate that the access device 100 expects to the nonvolatile memory device 200. The remaining recording time display part 112 displays a recordable remaining time to the nonvolatile memory device 200.

The application 120 includes a transfer rate sending part 121 and remaining capacity receiving part 122, and controls operations of the transfer rate sending part 121 and remaining capacity receiving part 122. The transfer rate sending part 121 sends a transfer rate designated by a user via the transfer rate setting part 111 to the nonvolatile memory device 200 via the interface 130. In addition, via the interface 130, the remaining capacity receiving part 122 receives a remaining capacity, namely an empty capacity of the nonvolatile memory device 200, sent from the device 200. Here, the remaining capacity receiving part 122 further converts the received remaining capacity, that is, the empty capacity of the nonvolatile memory device 200, into the recordable remaining time, and displays the time by using the remaining recording time display part 112.

The interface 130 transfers file data and a file ID for identifying the file data from the application 120 to the nonvolatile memory device 200 in writing the file data, and transfers file data read from the nonvolatile memory device 200 to the application 120. The file ID is information used for identifying a file.

The nonvolatile memory device 200 includes a nonvolatile memory 210 and memory controller 220.

The nonvolatile memory 210, for example, is a flash memory having a size of 1 Gbytes. On this occasion, since a size of physical block is 256 kB, the nonvolatile memory 210 has 4,069 physical blocks. The physical block is composed of 128 2 kB-pages. To the physical blocks, physical block numbers PBN0 to 4095 are subsequently added.

The memory controller 220 includes an interface 230 for sending data and commands to the access device 100 and for receiving them from the device 100, reading and writing control part 240, and remaining capacity sending part 250.

The reading and writing control part 240 includes a physical region management table 241 and mapping table 242, and reads and writes file data sent and received by the interface 230 from and to the nonvolatile memory 210 on the basis on a file ID sent from the access device 100.

As shown in FIG. 10, the physical region management table 241 shows the number of valid pages in the respective physical blocks of the nonvolatile memory 210 for each physical block number (PBN). The number of valid pages shows the number of pages storing valid data.

Figure 11:
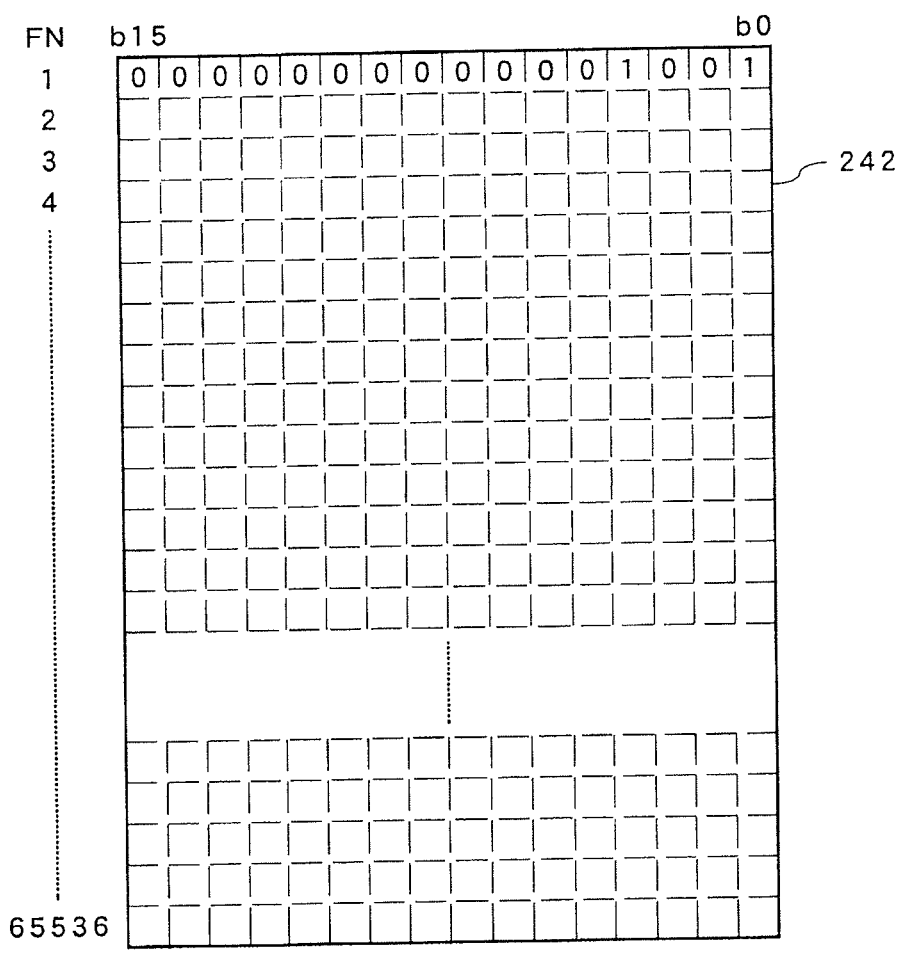
FIG. 11 is a memory map showing a mapping table of the embodiment.

As shown in FIG. 11, the mapping table 242 shows physical block numbers (PBN) storing file data related to a file ID for each file ID.

The remaining capacity sending part 250 includes a filling rate calculation part 251, remaining capacity table 252 of remaining capacity information, and remaining capacity detection part 253. The filling rate calculation part 251 receives a transfer rate sent from the access device 100, calculates a filling rate realizing the transfer rate by using a graph shown in FIG. 12, and determines the maximum number of valid pages, that is, a maximum value of the number of valid pages in a physical block, realizing the transfer rate on the basis of the calculated filling rate.

Figure 12:
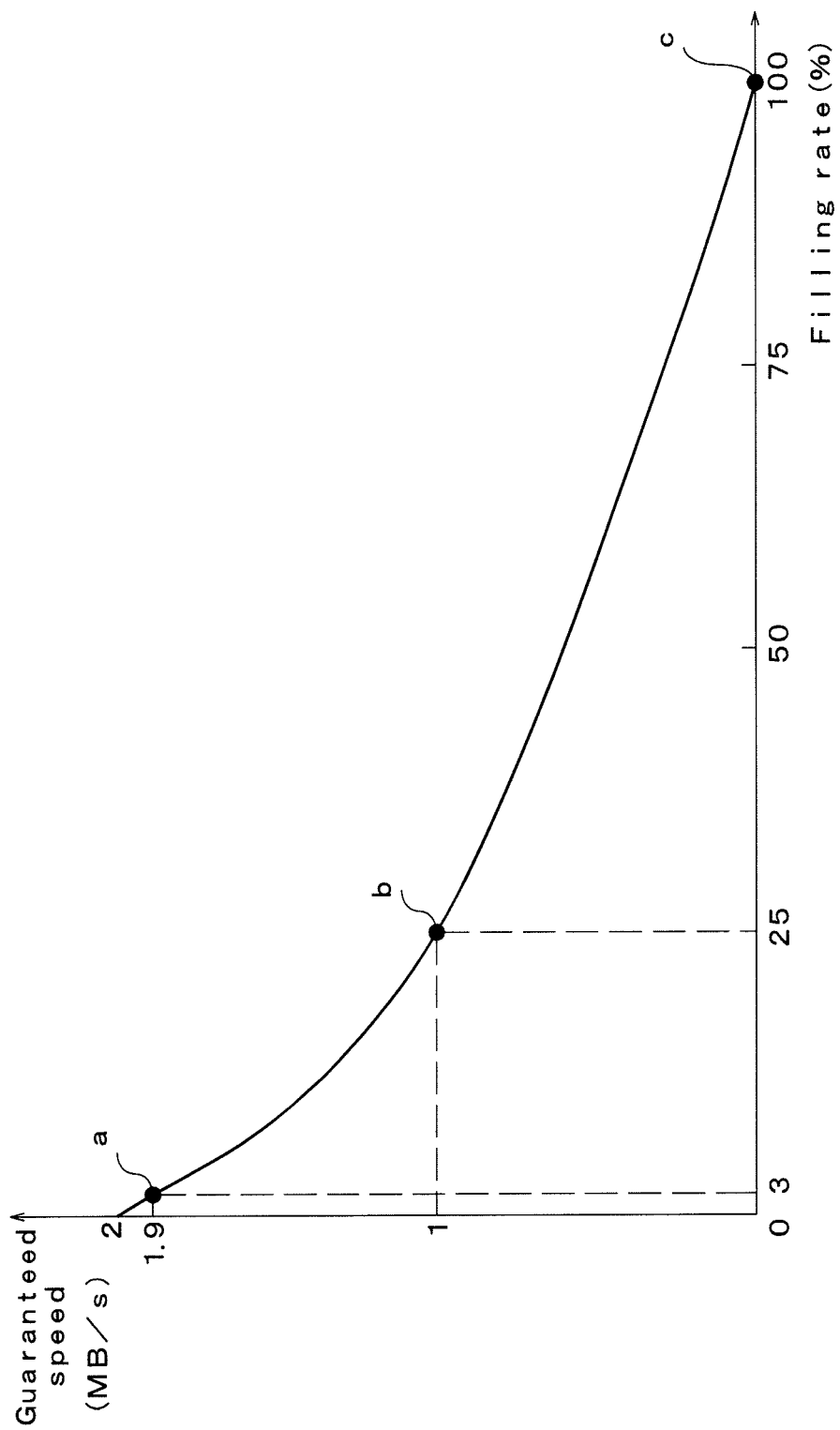
FIG. 12 is a graph showing one example of a relationship between a filling rate of physical block and a guaranteed speed.

The graph in FIG. 12 shows one example of relationship between the filling rate of one physical block and the transfer rate. When a transfer rate guaranteed by the nonvolatile memory device 200 to the access device 100 is referred to as a guaranteed speed, the filling rate is determined to be 3% or less by a point "a" to realize a guaranteed speed of 1.9 MB/s and the filling rate is determined to be 25% or less by a point "b" to realize a guaranteed speed of 1 MB/s.

As shown in FIG. 13, the remaining capacity table 252 is made by obtaining the number of valid pages in a physical block in the order from the physical block number PBN0 in the physical region management table 241 and summing up the number of corresponding physical blocks for each of the numbers of valid pages.

The remaining capacity detection part 253 calculates a remaining capacity of the nonvolatile memory 210 on the basis of the maximum number of valid pages received from the filling rate calculation part 251 and on the number of physical blocks with the filling rate or less obtained from the remaining capacity table 252, and sends the calculated capacity to the access device 100.

Figure 14A:
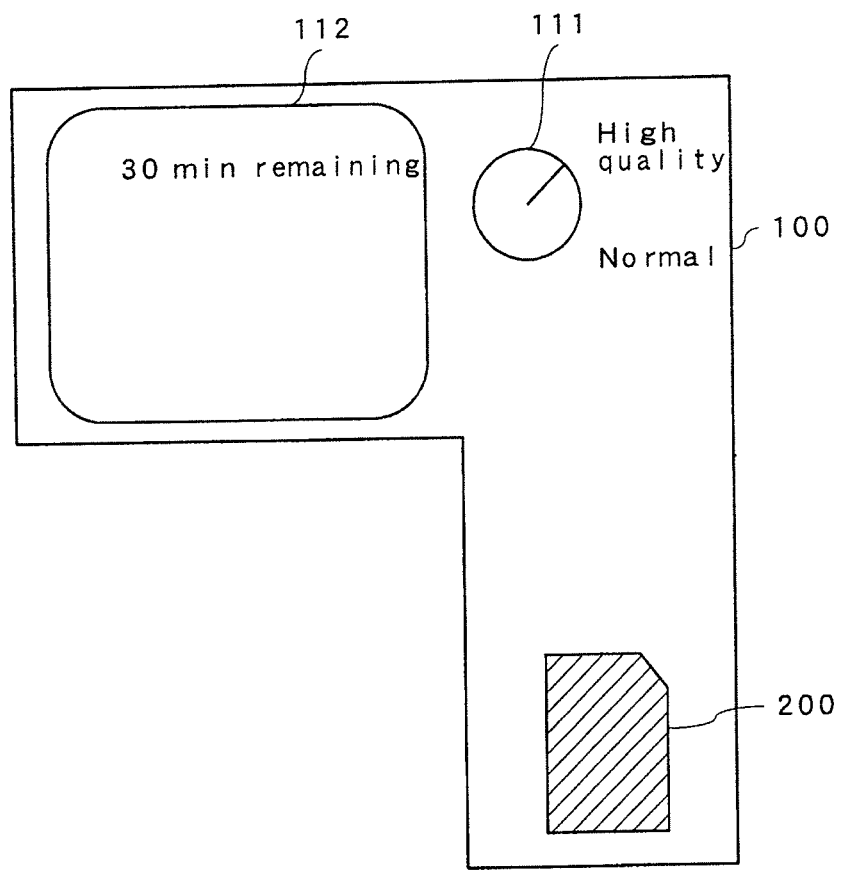
FIG. 14A is a view showing one example of the nonvolatile memory system in the embodiment of the present invention.

The access device 100 and the nonvolatile memory device 200, for example, can employ configurations shown in FIG. 14A and FIG. 14B. The nonvolatile memory system in FIG. 14A includes the access device 100 that is, for example, a video recording apparatus and the nonvolatile memory device 200 attached to the access device 100. The access device 100 includes the transfer rate setting part 111 and recording time display part 112.

The transfer rate setting part 111 is a switch for changing a shooting mode between a high quality mode for shooting in high image quality and a normal mode for shooting in standard image quality, and FIG. 14A shows that the mode is set to the high quality mode. The remaining recording time display part 112 displays a remaining time for which the shooting in the image quality set by the transfer rate setting part 111 can be continued, and FIG. 14A shows that the remaining time for the continued shooting is 30 minutes.

FIG. 14B shows a state where the transfer rate setting part 111 is set to the normal mode, and shows that the remaining time for the continued shooting is 50 minutes.

Figure 15:
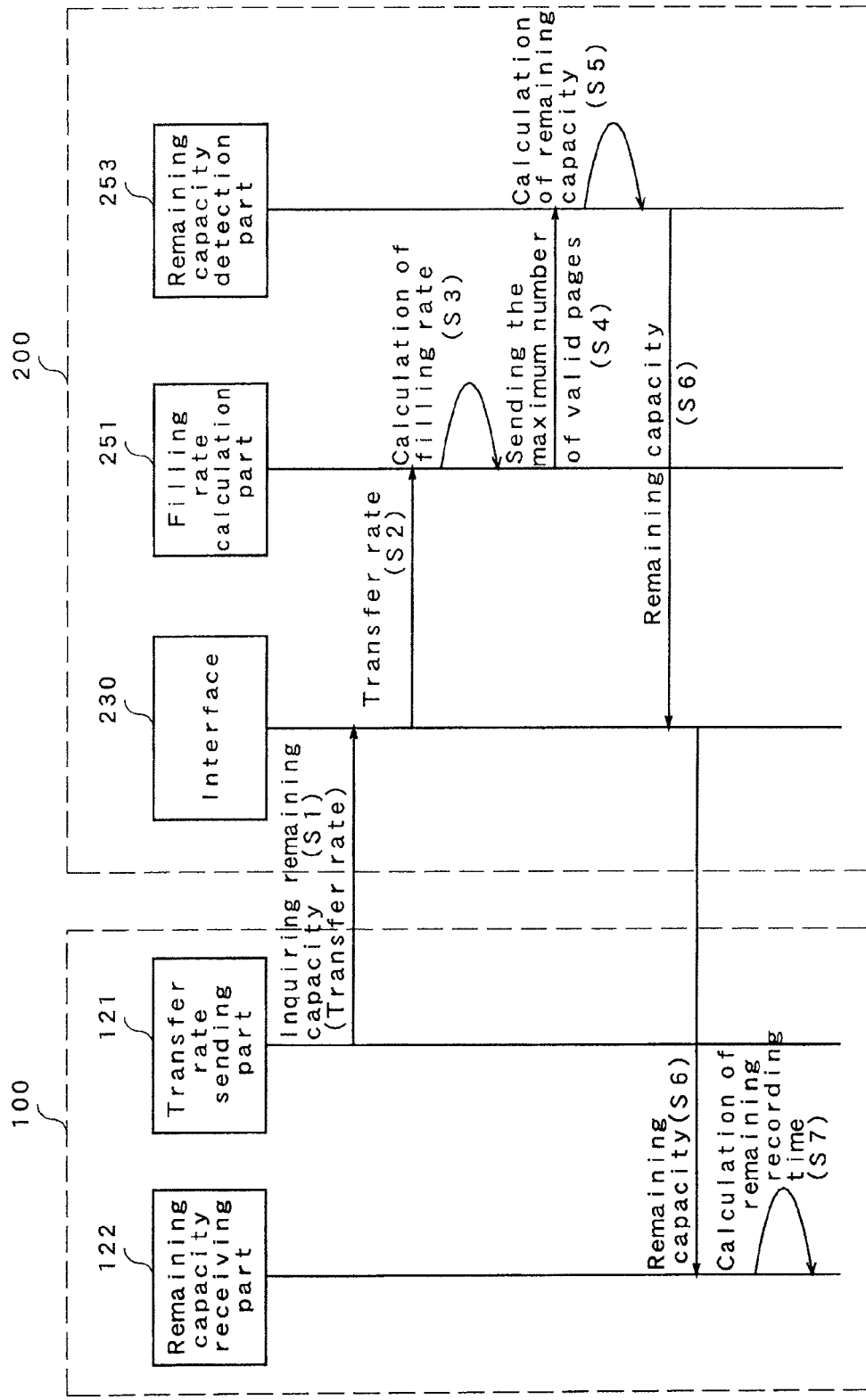
FIG. 15 is a time chart showing a process of detection of a remaining capacity and a process of calculation of a remaining recording time.

In the nonvolatile memory system having such configuration, a process in which the nonvolatile memory system 200 calculates a remaining capacity based on a transfer rate designated by the access device 100 and sends the capacity will be explained with using a time chart in FIG. 15. To simplify the description, the nonvolatile memory has no bad block, and the access device 100 can use all the physical blocks of the nonvolatile memory 210.

At first, initialization processing of the nonvolatile memory device 200 in starting up the power source will be explained. When the nonvolatile memory device 200 is attached to the access device 100, the access device 100 supplies the power to the nonvolatile memory device 200 via an external bus. At this moment, the memory controller 220 executes basic initialization processing such as the clearing of internally included various RAMs and the releasing of reset to the nonvolatile memory 210, and shifts to a period for creating various tables.

The reading and writing control part 240 scans the respective pages in each physical block in the ascending order from the physical block number PBN0 in the nonvolatile memory 210 and detects file IDs and the number of pages with no data. The reading and writing control part 240 constitutes the physical region management table 241 and mapping table 242 on an internally included RAM by using the detected number of pages and the file IDs.

In synchronization with this, the remaining capacity sending part 250 obtains the number of valid pages in each physical block in the order from the physical block number PBN1 on the physical region management table 241, and accumulates the obtained number of valid pages in the remaining capacity table 252 of the remaining capacity sending part 250. After such initialization processing, the access device 100 is ready to shoot a moving image.

After completion of the initialization processing, when a user sets the transfer rate setting part 111 to the high quality side to shoot a moving image, the transfer rate sending part 121 sends a transfer rate requested by the access device 100 to the nonvolatile memory device 200 in order to inquire a remaining capacity (S1).

The transfer rate sent at S1 is sent to the filling rate calculation part 251 via the interface 230 (S2). The filling rate calculation part 251 calculates a filling rate corresponding to the transfer rate requested by the access device 100 with referring to the graph in FIG. 12 (S3), and calculates the maximum number of valid pages realizing the transfer rate on the basis of the calculated filling rate and sends the maximum number to the remaining capacity detection part 253 (S4). In the graph in FIG. 12, the transfer rate corresponding to the filling rate obtained from the maximum number of valid pages calculated at S4 is a guaranteed speed that the nonvolatile memory device 200 guarantees to the access device 100.

The remaining capacity detection part 253 obtains the number of physical blocks with the number of valid pages equal to or less than the maximum number of valid pages received from the remaining capacity table 252, and calculates a remaining capacity of the nonvolatile memory 210 by using a method explained below (S5).

In a case where the maximum number of valid pages to realize the transfer rate sent by the access device 100 is pages (s is an integer number), when the number of physical blocks having k valid pages (k is an integer number, $0 \leq k \leq s$) is B(k), the remaining capacity corresponding to the guaranteed speed can be generally calculated by following expression (1). Here, the physical block has 128 pages, and a size of the page is 2 kB. Accordingly, a unit of the calculated value is kB. Meanwhile, the s indicating the maximum number of valid pages is a value which can be obtained by multiplying the filling rate with the number of pages in a physical block and rounding a fractional portion of the obtained number.

(Expression 1)

$$\sum_{k=0}^{s} 2(128-k)B(k) \qquad (1)$$

For example, when the transfer rate requested by the access device 100 is 1.9 MB/s, the filling rate calculation part 251 calculates a filling rate of a physical block realizing this transfer rate by using the graph in FIG. 12. According to the point "a" in FIG. 12, the filling rate realizing the transfer rate 1.9 MB/s is 3% or less. It can be found that a physical block where the number of valid pages occupies 3% of 128 pages in one physical block, that is, the number is 3.84 pages realizes the transfer rate 1.9 MB/s. The filling rate calculation part 251 truncates a decimal of the calculated number of valid pages, and determines a maximum number of valid pages to 3. Here, the value of the maximum number of valid pages, s, in expression (1) is determined to 3. The remaining capacity detection part 253 receives the maximum number of valid pages, 3, from the filling rate calculation part 251, and obtains the number of physical blocks with 3 valid pages or less with referring to the remaining capacity table 252 in FIG. 13. In addition, since a transfer rate corresponding to the filling rate at which the number of valid pages is 3 in FIG. 12 is a guaranteed speed of the nonvolatile memory device 200 to the access device 100, the guaranteed speed is a value larger than the transfer rate 1.9 MB/s. The numbers of physical blocks with 0, 1, 2, and 3 valid page(s) are 1000, 20, 50, and 10, respectively.

When applying the numbers of physical blocks and valid pages detected from the remaining capacity table 252 to expression (1), the remaining capacity is calculated to be approximately 269.7 MB as shown in following expression (2);

$$256 \times 1000 + 254 \times 20 + 252 \times 50 + 250 \times 10 = 276, \quad (2)$$
$$180 \ (kB) \sim 269.7 \ (MB).$$

In stead of this calculation, the remaining capacity can be roughly calculated. Since the numbers of valid pages are 0 to 3 when the transfer rate is 1.9 MB/s, a size of each physical block can be assumed as 2×(128−3)=250 kB. Accordingly, the remaining capacity can be calculated to be 250×(1000+ 20+50+10)kB.

Other methods for roughly calculating the remaining capacity will be explained. At first, a capacity obtained by subtracting a capacity of the maximum number of valid pages calculated by the filling rate calculation part 251 from a capacity of physical block is determined as an empty size of physical block. After obtaining, from the remaining capacity table 252, the total number of physical blocks with the number of valid pages less than the maximum number of valid pages determined by the filling rate calculation part 251, the remaining capacity can be roughly calculated on the basis of the total number of the physical blocks and the empty capacity of the physical blocks. For example, when the maximum number of valid pages is 64 pages, an empty capacity of physical block can be assumed to be 128 kB by subtracting a capacity of the maximum number of valid pages from a capacity of physical block, 256 kB. Subsequently, by obtaining the total number of physical blocks with the number of valid pages less than 64 valid pages from the remaining capacity table 252 and multiplying a capacity of physical block, 128 kB, with the total number, a roughly calculated result of the remaining capacity can be obtained.

The remaining capacity detection part 253 sends the remaining capacity calculated in such manner to the access device 100 via the interface 230 (S6).

The remaining capacity receiving part 122 calculates a remaining recording time, a time for which a moving image can be shot, by dividing the received remaining capacity by the guaranteed speed, and displays the time on the remaining recording time display part 112 (S7).

As described above, according to processes from S1 to S7, the remaining recording time, for example, "30 min remaining" is displayed on the remaining recording time display part 112 as shown in FIG. 14A. When the transfer rate setting part 111 is set to the normal quality side as shown in FIG. 14B, physical blocks with high filling rates can be used because a transfer rate requested by the access device 100 is low. The remaining capacity is accordingly enlarged compared to the case where the transfer rate setting part 111 is set to the high quality side, and also the remaining recording time displayed on the remaining recording time display part 112 will be longer, for example, "50 min remaining"

The description mentioned above explained a process for detecting a remaining capacity of the nonvolatile memory device 200, which is executed prior to the writing of file data. In the subsequent file data writing. The interface 230 firstly receives a writing command from the access device 100, a file number as the file ID, a file size, file data (file data 1 to file data i), and a transfer rate requested by the access device 100. Here, the file number is 1 and i is 4. That is, a size of the file data corresponds to a size of 4 physical blocks.

The interface 230 supplies the transfer rate requested by the access device 100 to the filling rate calculation part 251, and supplies a filling rate corresponding to the transfer rate to the reading and writing control part 240. Referring to the physical region management table 241, the reading and writing control part 240 obtains physical block numbers corresponding to the guaranteed speed with a predetermined filling rate or less, for example, PB9, PB25, PB41, and PB50, to record file data 1 to file data 4. And, the reading and writing control part 240 accumulates the first physical block number (PB9) at a position of file number 1 in the mapping table 242. FIG. 12 shows a state of the mapping table 242 at this moment. After that, as shown in FIG. 16A, file data 1 is written subsequently to pages 0 to 127 of PB9, file data 2 to 4 are written to PB25, PB41, and PB50 in the same manner, respectively. On this occasion, a management region in page 0 of PB9 stores pointers indicating PB25, PB41, and PB50. As shown in FIG. 16B, the management region in page 0 of PB9 may store a pointer indicating a next link target. The presently mentioned pointer refers to the physical block number.

As described above, the nonvolatile memory system shown in the present embodiment does not employ different address spaces in the access device 100 and nonvolatile memory device 200. Instead of this, the access device 100 designates a file ID to the nonvolatile memory device 200, and the nonvolatile memory device 200 maps file data corresponding to the file ID on the physical address space of the nonvolatile memory 210. In this manner, the access device can correctly obtain a remaining capacity to realize the writing of file data with ensuring a guarantee of the designated transfer rate.

As another example, the access device 100 also can request a list of remaining capacities classified by speeds to the nonvolatile memory device 200 and detect the remaining capacity on the basis of the list received by the access device 100. Or, also when the nonvolatile memory device 200 notifies the access device 100 of the list of remaining capacities classified by speeds regardless of the request by the access device 100, the same effect as that of the present embodiment can be obtained.

In the present embodiment, the nonvolatile memory system including the access device for shooting a moving image was explained. Not only in this system but also in a nonvolatile memory system including an access device for shooting a still image, and also in a nonvolatile memory system including an access device for recording sound, the present invention can be employed.

In addition, although the remaining capacity of the nonvolatile memory device is displayed after converted into a time in the present embodiment, the remaining capacity may be directly displayed without the conversion.

INDUSTRIAL APPLICABILITY

The present invention proposes a method, in a nonvolatile memory system, for easily obtaining a remaining capacity of a memory corresponding to a transfer rate requested by an access device. This is profitable in a device having an application requiring a high transfer rate such as the shooting of a moving image with high quality, for example, a movie recording and reproducing device, a still image recording and reproducing device, and a mobile phone.

What is claimed is:
1. A memory controller connected to a nonvolatile memory having a plurality of physical blocks composed of a plurality of pages comprising:
a capacity detector for receiving a writing data transfer rate to said nonvolatile memory from an outside, detecting target physical blocks in which the number of used pages holding valid data or storing invalid data in each physical block is equal to or less than a predetermined number determined depending on said transfer rate, calculating an empty capacity of said nonvolatile memory from the target physical blocks and sending the empty capacity to the outside.

2. A nonvolatile memory device comprising:

a nonvolatile memory having a plurality of physical blocks composed of a plurality of pages; and a memory controller and for storing file data, wherein said memory controller includes:

a capacity detector for receiving a writing data transfer rate to said nonvolatile memory from an outside, detecting target physical blocks in which the number of used pages holding valid data or storing invalid data in each physical block is equal to or less than a predetermined number determined depending on said transfer rate, calculating an empty capacity of said nonvolatile memory from the target physical blocks and sending the empty capacity to the outside.

3. A nonvolatile memory system comprising:

an access device; and a nonvolatile memory device for storing file data, wherein said access device includes:

a transfer rate sending part for sending a transfer rate used for file data transfer to the nonvolatile memory device; and a remaining capacity receiving part for obtaining a remaining capacity of said nonvolatile memory device based on the sent transfer rate, and said nonvolatile memory device includes:

a nonvolatile memory having a plurality of physical blocks composed of a plurality of pages;

a capacity detector for receiving a writing data transfer rate to said nonvolatile memory from said access device, detecting target physical blocks in which the number of used pages holding valid data or storing invalid data in each physical block is equal to or less than a predetermined number determined depending on said transfer rate, calculating an empty capacity of said nonvolatile memory from the target physical blocks and sending the empty capacity to the access device.

4. An empty capacity detecting method for detecting an empty capacity of a nonvolatile memory having a plurality of physical blocks composed of a plurality of pages comprising:

receiving a writing data transfer rate to said nonvolatile memory from an outside;

detecting target physical blocks in which the number of used pages holding valid data or storing invalid data in each physical block is equal to or less than a predetermined number determined depending on said transfer rate;

calculating an empty capacity of said nonvolatile memory from the target physical blocks; and sending the empty capacity to the outside.

\* \* \* \* \*